United States Patent [19]

Budd et al.

[11] Patent Number: 4,910,031

[45] Date of Patent: Mar. 20, 1990

[54] TOPPED SAVORY SNACK FOODS

[75] Inventors: David L. Budd, Plano; David L. Curtis, Arlington; O. George Dowdie; Rajen S. Mehta, both of Irving, all of Tex.

[73] Assignee: Frito-Lay, Inc., Dallas, Tex.

[21] Appl. No.: 286,140

[22] Filed: Dec. 19, 1988

[51] Int. Cl.⁴ ............................................. A23L 1/217
[52] U.S. Cl. .................................... 426/96; 426/102; 426/103; 426/291; 426/292; 426/534; 426/808
[58] Field of Search ................ 426/96, 102, 103, 291, 426/292, 534, 618, 637, 808, 93, 94

[56] References Cited

U.S. PATENT DOCUMENTS

| | | | |
|---|---|---|---|
| 2,333,442 | 11/1943 | Rex | 99/83 |
| 2,824,009 | 2/1958 | Lindow | 99/166 |
| 3,868,466 | 2/1975 | Swisher | 426/199 |
| 4,293,572 | 10/1981 | Silva et al. | 426/19 |
| 4,501,758 | 2/1985 | Morris | 426/93 |
| 4,544,565 | 10/1985 | Barnett | 426/538 |
| 4,642,240 | 2/1987 | Barnett et al. | 426/538 |
| 4,645,674 | 2/1987 | Lang et al. | 426/94 |
| 4,710,228 | 12/1987 | Seaborne et al. | 106/218 |
| 4,738,865 | 4/1988 | Morris | 426/658 |
| 4,769,248 | 9/1988 | Wilkins et al. | 426/291 |

FOREIGN PATENT DOCUMENTS

| | | |
|---|---|---|
| 207515 | 1/1987 | European Pat. Off. . |
| 207516 | 1/1987 | European Pat. Off. . |
| 2139470 | 1/1984 | United Kingdom . |
| 2157148 | 10/1985 | United Kingdom . |

OTHER PUBLICATIONS

Lewis Barker ed., "The Psychobiology of Human Food Selection", Avi Publishing Co., 1986, pp. 13-14.

*Primary Examiner*—Donald E. Czaja
*Assistant Examiner*—Evan Federman
*Attorney, Agent, or Firm*—Bernard, Rothwell & Brown

[57] ABSTRACT

Improved savory snack food items include a nonsweet, sugar-based binder composition which adheres one or more toppings to a base portion of the snack. The binder does not undesirably alter the taste of snack food items and substantially reduces separation of toppings from the snack food items during production, packaging, shipping and, most importantly, during handling by the consumer. The binder also reduces transfer of oil and fat and powders to the hands of the consumer.

41 Claims, No Drawings

TOPPED SAVORY SNACK FOODS

FIELD OF THE INVENTION

The present invention relates to savory snack foods and methods of making them. More specifically, the present invention relates to improving topped savory snack foods with the use of novel non-sweet, sugar-based binders.

BACKGROUND ART

One problem long associated with many varieties of snack foods is the tendency of topically applied substances, such as seasonings and decorations (often referred to as "toppings" herein), to become separated from the base portion of the food product. Such separation may occur, for example, during the preparation, packaging or transit of the food item. Separation during preparation or packaging can result in increased production costs and can complicate processing. Separation during packaging or transit can result in loose toppings becoming collected at the bottom of the package, while the product reaching the consumer has less than the desired complement of topping thereon.

A further type of undesirable separation of topping from snack food items occurs when the product is eaten. Frequently the topping adheres to the hands of the consumer. This phenomenon is referred to as "rub-off" both by the industry and in the present application. Rub-off of toppings from any snack food item is undesirable because, again, the product reaching the mouth of the consumer includes a reduced amount of the toppings. Rub-off of toppings, especially powdery or oil or fat-based toppings, is undesirable as it can leave a residue upon the hands of the consumer. Accordingly, the need exists for reducing all types of topping separation from snack food items prior to being consumed. A particular need exists for reducing the rub-off of powdery or oil and fat-based toppings onto the hands of consumers.

As stated briefly above, the present invention is directed to improvements in savory snack food items. The term "savory" is used herein as it is used in the industry to denote sack food items having a non-sweet dominant flavor. Many savory snack foods have saltiness and/or cheesiness as dominant flavors. Examples of savory snack foods include potato chips, pretzels, cheese puffs, corn chips, tortilla chips, crackers and the like. The dominant flavors of these snack foods sharply contrast with the sweet dominant flavors of non-savory snacks such as cookies, doughnuts and candies.

Savory snack food items frequently comprise a "base" food product portion and one or more toppings. Examples of snack food base portions include vegetable slices (e.g. fried potato slices of topped or seasoned potato chips), cooked dough pieces (e.g. of topped crackers or pretzels), and puffed food products (e.g. the extruded puffed corn collet of cheese-flavored puffs). Examples of common toppings include coarse and fine ground salt, pepper, seasoning powders such as garlic powder and onion powder, and fat and oil-based toppings such as cheese powders and granules.

According to the present invention, novel binders are employed to improve the adherence of toppings to base portions of snack food items in order to reduce rub-off. The binders also advantageously reduce the transfer of fat or oil from snack food items to the hands of consumers.

SUMMARY OF THE INVENTION

In accordance with one aspect of the present invention, there is provided a savory snack food item comprising a base portion, a topping and a non-sweet binder composition for binding the topping to the base portion, the binder comprising one or more simple or complex carbohydrates having a degree of sweetness (hereinafter referred to collectively as "sugars") and an amount of sweetness suppressor effective to suppress some or up to about all of the sweet taste of the binder composition. In accordance with other aspects of the invention, a mixture of one or more toppings and the non-sweet, sugar-based binder may be prepared and then applied to the base portion of the snack food product to promote adhesion between the base and the toppings. Alternatively or additionally the non-sweet, sugar-based binder may be applied as a coating over a previously-topped snack food item to envelop the entire item and provide a protective barrier to further promote adhesion, deter rub-off and diminish the transfer of the topping or oil to the hands. The non-sweet, sugar-based binder also may be applied as a coating over a base portion and over which toppings are applied.

In yet another aspect, the present invention relates to non-sweet, sugar-based binder compositions for food products comprising one or more sugars and an amount of sweetness suppressor effective to suppress at least some of the sweet taste of the binder composition. The binder compositions preferably are prepared as concentrated solutions of one or more sugars in water and further include an effective amount of sweetness suppressor and, optionally, an emulsifier.

DETAILED DESCRIPTION

The high sugar content of the present binder compositions imparts many beneficial qualities to the improved snack food items. For example the binder compositions, although applied as aqueous solutions, exhibit relatively low water activity ($A_w$) due to their high sugar content. This low $A_w$ of e.g. about 0.65 to 0.9 and above reduces the tendency of the water to migrate from the aqueous binder composition and into the product structure. Water uptake by the food piece can result in the softening of a crisp, rigid porous structure and the collapse of this structure. Softening and collapse both result in a loss of crispness and a reduction of texture acceptability.

Some sugars, because of their humectancy, enhance the improved snack food's tolerance for moisture and thus prolong the shelf life of the product. Because of its inherent physiochemical properties, sugar also adds structure which, through known processing techniques, can be used to control texture and mouthfeel and to provide a sheen or gloss to the product surface. These same properties make sugars inherently cohesive and thus well-suited for use in binding compositions. Advantageously, the non-sweet, sugar-based binder dissolves and dissipates rapidly in the mouth, thereby allowing the underlying flavors to be sensed rapidly. This rapid dissipation compares favorably to the much slower dissipating methylcellulose (Methocel ®) and fat-containing binders. The present binders also permit the preparation of reduced-fat-containing snack food items while minimizing the perceived loss of desirable mouthfeel and textural qualities.

While sugar-based coatings provide the advantages mentioned above, the sweet taste imparted by the sugar would be highly inappropriate for savory snack food items. The inventive binder compositions possess the above-noted advantages of sugar-based compositions but are not sweet tasting and do not interfere with the desired flavors of the snack food products in which they are used.

Binder compositions according to the present invention in their aqueous form comprise, by weight, about 20 to 80% sugars, about 20 to 80% water and an amount of a sweetness suppressing agent effective to suppress up to about all of the sweet taste of the binder composition. The aqueous binder compositions preferably comprise about 50 to 75% sugars and 25 to 50% water.

The binder compositions optionally also comprise an emulsifying agent to enhance compatibility between hydrophobic toppings and the aqueous binder compositions. An amount of emulsifier effective to promote compatibility (i.e. adhesion) between the topping and the binder composition is useful, and such amount can readily be determined by the artisan. Often about 0.02 to 2% by weight, and preferably about 0.1 to 1%, of emulsifier is included in the binder composition.

The amount of sweetness supressing agent to effectively suppress sweet taste of the sugar-based binder varies from agent to agent and further varies based upon the degree of sweetness suppression desired. An effective amount of any specific sweetness suppressing agent is readily determined by those skilled in the art based upon the potency of the particular sweetness suppressing agent, the sweetness of the sugar(s) employed in the binder composition and the degree of sweetness suppression desired in the final product.

A wide variety of simple and/or complex carbohydrates possessing a degree of sweetness (hereinafter "sugars") may be used in the binder composition. These include, by way of illustration and not limitation, mono and polysaccharides having a degree of polymerization ($D_p$) up to about 10. Sugars may be of natural or synthetic origin and may comprise naturally occurring or man-made mixtures of sugars. Preferred sugars are sucrose, lactose, maltodextrins, fructose syrups, polydextrose and syrup solids. Sucrose is especially preferred. The proportion of sugar in the binder should be high enough so as to function effectively to bind together the topping and the base and to effectively reduce topping rub-off. Using a high percentage of sugar in the binder keeps water activity low and helps prevent water migration into the snack food base, preventing undesired structure and texture changes prior to drying.

An emulsifying agent in the binder composition may be used to reduce the lipophobic tendencies of the aqueous sugar solution. By reducing the binder's lipophobic tendencies, the binder composition is able to stick better to fat or oil-containing ingredients, especially when the binder composition is applied as a coating over a fat-based topping such as cheese powder. The emulsifying agent also improves the flow of the binder composition. Preferably, the emulsifying agent has a high HLB (hydrophile-lipophile balance) value. A particularly preferred emulsifier is Polysorbate 60 (polyoxyethylene (20) sorbitan monostearate). Other emulsifying agents (including those having medium HLB values) are known to those skilled in the art and are useful.

The sweetness suppressing agent used in the binder composition can be selected from known agents such as oak and chicory extracts, hexyl and heptyl sulfate salts, heptyl and octyl sulfonate salts, etc. The addition of a sweetness suppressing agent to the binder makes it possible to cover a savory snack with a sugar-based binder without substantially interfering with the flavor of the savory snack. Preferably, he sweetness suppressing agent is Lactisole ® (a trade name for 2-(4-methoxyphenoxy)propanoic acid produced by Tate & Lyle PLC, London, England) or related compounds described in U.K. Patent Applications GB 2,157,148 and GB 2,139,470 assigned to Tate & Lyle PLC and hereby incorporated by reference.

Lactisole and related compounds have the desired property of being extremely effective in suppressing or reducing sweetness at low dosage levels. These compounds impart almost no flavor or after taste of their own ("off flavors"), do not adversely affect flavors other than sweetness and are relatively heat stable. Additionally, Lactisole ® sweetness suppressor is extremely short acting. From about 0.005 to 0.5 percent of Lactisole ® sweetness suppressor on a dry weight basis, based on the amount of sugar, is useful to suppress at least some and up to about all of the sweetness of sugar-containing compositions. Preferably about 0.08 to 0.12 and especially about 0.1 percent of Lactisole ® on a dry weight basis is employed in sucrose-based binder compositions of the present invention. Excessive Lactisole ® content may produce undesired tastes while insufficient content is ineffective to produce the desired effect.

The inventive compositions and methods are not limited to so-called snack food items but do find particular utility therewith as these items (a) often include toppings that are prone to separation or rub-off, especially fat-based toppings such as cheese powders; and (b) are generally eaten out of the hands. Examples of savory snack food items which can be improved via the present invention include crackers corn chips, potato chips, tortilla chips, corn puffs and the like, as well as reduced calorie and/or reduced fat snack food equivalents of the same. The snack food item preferably is cooked prior to application of the present binder, although application of the binder to a partially cooked dough item or vegetable slice is useful as long as further cooking does not destroy of any of the toppings.

The topping material with which the binder is used may comprise any of a number of common savory snack food toppings and seasoning materials such as salt and seasoning powders such as onion, garlic, and barbecue flavored powders and/or granules. The present composition is particularly effective in binding fat-based seasonings or toppings such as cheese powder and granules to snack foods. Fat-based toppings and seasonings often comprise particulate solids dispersed in a water and oil emulsion. Total fat content can vary e.g. from 10 to 70% by weight. These toppings are often "tacky" to the touch and are easily rubbed off onto the hand of the consumer.

The present non-sweet, sugar-based binder compositions can be used to improve snack food items via one or more of at least three methods of application: Improved oily, powder-covered items, e.g. cheese powder-covered corn collets, are prepared (to reduce the transfer of powder and oil to the fingers) by (1) coating collets with a mixture prepared from cheese powder topping and non-sweet sugar-based binder. The adhesion of particulate toppings to a "base" corn collet or other food piece also is improved by (2) applying the binder to the base piece and then coating thereover with one or more toppings. Particulate-covered items are improved by (3) applying the binder as a coating over the previously-topped item whereby rub-off is reduced.

The aqueous binder composition may be heated prior to applying it to the snack to reduce its viscosity. Preferably, the binder composition is heated to a temperature between 37+ and 52° C. to reduce viscosity to a level which facilitates mixing, pumping and application. The binder may be applied to the snack food by conventional means such as spraying or brushing the binder onto the snack food. The amount of binder applied to the snack food item usually represents between about 3 to 70%, preferably between about 5 to 20%, of the weight of the snack food when the binder i wet and 2 to 50%, preferably 3 to 15% of the weight of the snack food when the binder is dried. The total amount of binder to be employed depends upon the composition and texture of the toppings and the base portion. Those skilled in the art will optimize the amount of binder employed so that the minimum amount needed to obtain the desired properties is used.

With certain snack foods, such as cheese puffs, it may be desirable to tumble or agitate the snack food during spraying to provide an even coating.

The coated snack food item is dried following application of the aqueous binder composition to remove excess moisture which could otherwise adversely affect the texture, appearance and/or shelf life of the product. In general, a final moisture content of less than about 2% by weight is desired. Drying times and temperature will vary based upon the type(s) and amount(s) of sugar(s) present in the binder. For example, higher DE sugars can be harder to dry, as a general rule. Reducing sugars are prone to brown and thus require the use of generally lower drying temperatures. Drying of preferred sucrose-based binders preferably is carried out in a vacuum oven at 20 to 120 mm Hg and at 30° to 90° C., preferably 65° to 72° C. Alternatively, drying in a forced air oven at 50° to 170° C., preferably 104° to 110° C., also is satisfactory. After drying, the improved snack food is allowed to cool prior to packaging.

The finished product is an improved snack food item including a bland, non-sticky binder which advantageously reduces separation of powdery and particulate toppings, such as seasonings, decorations and the like. When applied as a coating over fatty or oily items, the transfer of fat or oil to the hands of the consumer can be reduced. Unlike other products (e.g. hard fat coatings), the binder dissolves rapidly and dissipates rapidly in the mouth for fast release of flavors from the toppings.

The invention is illustrated further by the following examples which are not intended to be limiting. All percentages are by weight unless noted otherwise.

EXAMPLE I

In this example, the binder formulation comprised 65% sucrose, 34.5% water, 0.43% Polysorbate 60 and 0.07% Lactisole® sweetness suppressor. 200 g of CHEE.TOS® brand cheese flavored snacks - puffed balls (finished commercial product) were placed in a vibrating tray. In a number of trials the aqueous binder which had been heated to between 37° and 52° C. was evenly sprayed onto the product over the course of 20 to 30 seconds. The amount of binder applied when wet was approximately 9% of the total weight of the snack food product. The coated snack food products were then placed in a vacuum oven at about 65° to 72° C. for 1 to 1½ hours, and then removed and allowed to cool.

The binder composition comprised about 6% of the dry weight of the products. The finished products had a light, bland protective coating which significantly reduced rub-off of the cheese powder. The coating rapidly dissolved and dissipated in the mouth, thereby allowing the coated cheese powder to provide a fast cheese puff flavor.

EXAMPLE II

In this example, a reduced oil product was prepared. The product contained approximately 50% reduced oil content compared to Example I. 128.6 g of dried corn collets were placed in a seasoner. A slurry of 32 g of warm (approximately 100°–110° F.) coating oil (92°–94° Wiley melting point hydrogenated soybean oil), 20 g cheddar cheese powder and 3.4 g salt was sprayed onto the collets. A non-sweet, sugar-based protective binder formulation of 65% sucrose, 34.5% water, 0.43% Polysorbate 60 and 0.07% Lactisole was heated to between 37° and 52° C. and was evenly sprayed on the product over the course of 20 to 30 seconds. The binder comprised approximately 9% of the weight of the coated snack food. The product was further processed as in Example I. The finished product had a light, bland protective coating which significantly reduced rub-off of the cheese powder and oil, yet added no perceptible sweetness. The coating also rapidly dissolved and dissipated in the mouth, thereby allowing the coated cheese powder to provide a fast cheese puff flavor hit. This product was less oily than that of Example I. It had good flavor, textural and mouthfeel characteristics.

EXAMPLE III

In this example, the binder was used as an adhesive to bind particulate toppings to the outside of potato chips. 36 g of potato chips were spread out on a flat surface. One side was sprayed with 2.7 g of a warm (37°–52° C.) solution of 65% sucrose, 34.5% water, 0.43% Polysorbate 60 and 0.07% Lactisole® sweetness suppressor. 4.2 g of Maltrin® M-100 (10 DE maltodextrin - Grain Processing Corp.) was dusted onto the chips to dissolve and become part of the binder composition.

A mixture of particulate toppings (4 g dried cheese particles, 7 g dried bacon bits and 1 g dried green onion flakes) was sprinkled onto the binder-treated chips. The chips were then placed in a forced air oven at 105° C. for 2 minutes to cause the Maltrin® to dissolve and to effect fusion of the binder with the particulates. The material was then subsequently placed in a vacuum oven at about 65°–72° C. for 1½ hours, and then removed and allowed to cool. The finished product had a light and crunchy texture, with most of the toppings effectively bound to the chip surface. The binder composition rapidly dissolved in the mouth allowing for good flavor and rapid product dissipation in the mouth. The sugar-based binder thus effectively binds particulates to the chip but does not impart any undesirable sweet taste.

EXAMPLE IV

In this example, the binder was applied to seasoned potato chips to enrobe the chips with a thin coating which enhances the binding of the seasoning and reduces the transfer of oil to the hands. 44 g of cheddar cheese and sour cream flavored potato chips (RUFFLES® brand potato chips) were placed in a rotating tumbler. 5.8 g of a binder at 37°–52° C. consisting of 65% sucrose, 34% water. 0.93% Polysorbate 60, and 0.07% Lactisole ® sweetness suppressor was sprayed onto the chips. The coated snack food was then placed in a vacuum oven at about 65°-72° C. and placed under a vacuum of 120 mm to 20 mm Hg for 1 to 1½ hours. The product was then removed and allowed to cool. The finished product had a good, rich cheddar cheese and sour cream flavor and was pleasing to the touch. The product was lightly coated with the protective coating, which dissolved rapidly in the mouth to provide a fast, strong cheddar and sour cream flavor sensation with no added sweetness.

EXAMPLE V

In this example a binder composition without added emulsifier was used to bind onion flakes to crackers. 50 g of saltine crackers were placed on a tray and 1.5 g of dried green onion flakes were sprinkled on top of the crackers. A binder solution of 66.62% sucrose, 33.31% water and 0.07% Lactisole ® sweetness suppressor was heated to 50° C and 4.0 g thereof was sprayed onto the topped crackers. The product was further processed as in Example I. The finished product was crisp and had a pleasing onion flavor. The binder composition dissolved rapidly in the mouth, thus rapidly releasing the onion flavor.

Although the present invention has been described in connection with certain specific examples and preferred embodiments, it is not to be limited thereby. Modifications within the scope of the appended claims will be apparent to those skilled in the art.

We claim:

1. An improved savory snack food item comprising a base portion, a topping and a binder means for binding the topping to the base portion, said binder means comprising sugar and an amount of sweetness suppressor effective to suppress up to about all of the sweetness of said binder means wherein said binder means exhibits a water activity of about 0.65 to about 0.9.

2. A snack food item of claim 1 wherein said sugar is selected from the group consisting of maltodextrin, fructose, glucose, high fructose syrup and corn syrup solids.

3. A snack food item of claim 1 wherein said binder means further comprises an emulsifying agent.

4. A snack food item of claim 1 wherein said sweetness suppressor comprises oak extract and chicory extract.

5. A snack food item of claim 1 wherein said sweetness suppressor is selected from the group consisting of hexylsulfate salt, heptylsulfate salt, heptylsulfonate salt and octylsulfonate salt.

6. A snack food item of claim 1 wherein said sweetness suppressor comprises 2-(4-methoxyphenoxy)-propanoic acid.

7. A snack food item of claim 1 wherein said binder comprises sucrose, polysorbate 60 emulsifier and an amount of 2-(4-methoxyphenoxy)propanoic acid effective to suppress up to about all of the sweetness of said binder means.

8. A snack food item of claim 1 wherein said topping comprises an oil or fat-containing composition.

9. A snack food item of claim 8 wherein said topping comprises cheese powder or cheese granules.

10. A snack food item of claim 1 wherein said base portion comprises a vegetable slice.

11. A snack food item of claim 10 wherein said vegetable slice is a potato slice.

12. A snack food item of claim 1 wherein said base portion comprises a corn collet.

13. A snack food item of claim 1 comprising about 0.005 to 0.5 percent, on a dry weight basis based on the weight of sugar, of 2-(4-methoxyphenoxy)propionic acid sweetness suppressor.

14. A snack food item of claim 1 comprising about 0.08 to 0.12 percent, on a dry weight basis based on the weight of sugar, of 2-(4-methoxyphenoxy)propionic acid sweetness suppressor.

15. A snack food item of claim 7 wherein said amount is about 0.08 to 0.12 percent, on a dry weight basis based on the weight of sucrose.

16. An improved savory snack food item comprising a base portion, a topping and a binder means for binding the topping to the base portion, said binder means comprising at least one sugar selected from the group consisting of sucrose, lactose, maltodextrin, fructose, glucose, high fructose syrup and corn syrup solids, an amount of sweetness suppressor effective to suppress up to about all of the sweetness of said binder means, and an amount of emulsifier effective to promote compatibility between said topping and said binder means wherein said binder means exhibits a water activity of about 0.65 to about 0.9.

17. An improved snack food item of claim 16 comprising about 2 to 50% of said binder composition on a dry weight basis.

18. An improved snack food item of claim 16 comprising about 3 to 15% of said binder composition on a dry weight basis.

19. An improved snack food item of claim 16 wherein said sweetness suppressor comprises 2-(4-methoxyphenoxy)propanoic acid.

20. An improved snack food item of claim 16 wherein said amount is about 0.08 to 0.12 percent on a dry weight basis based on the weight of sugar.

21. An improved savory snack food item comprising a base portion, a topping and a binder means for binding the topping to the base portion, said binder means comprising at least one sugar selected from the group consisting of sucrose, lactose, maltodextrin, fructose, glucose, high fructose syrup and corn syrup solids, an amount of 2-(4-methoxyphenoxy)propanoic acid sweetness suppressor effective to suppress up to about all of the sweetness of said binder means, and an amount of polysorbate 60 emulsifier effective to promote compatibility between said topping and said binder means wherein said binder means exhibits a water activity of about 0.65 to about 0.9.

22. An improved snack food product of claim 21 wherein said binder composition comprises by weight, about 20 to 80% of sugar, about 20 to 80% of water and about 0.02 to 2% of emulsifier.

23. An improved snack food product of claim 21 wherein said binder comprises, by weight, about 50 to 75% of sugar, 25 to 50% of water, 0.1 to 1 of emulsifier and about 0.01 to 0.2% of sweetness suppressor.

24. A method of binding a topping to a savory snack food item comprising the steps of:
(a) providing a snack food item base;
(b) applying to said base a non-sweet, sugar-based binder composition comprising a sugar and a sweetness suppressor wherein said binder composition exhibits a water activity of about 0.65 to about 0.9; and
(c) adhering a topping to said binder composition on said base.

25. A method of claim 24 wherein said binder composition comprise, by weight, about 50 to 75% of sugar, about 25 to 50% of water and an amount of sweetness suppressor effective to suppress any sweet taste of said binder.

26. A method of claim 25 wherein said binder composition further comprises about 0.1 to 1% of emulsifier.

27. A method of claim 25 wherein said sweetness suppressor comprises 2-(4-methoxyphenoxy)propanoic acid.

28. A method of claim 27 wherein said binder comprises about 0.08 to 0.12 percent, on a dry weight basis based on the weight of sugar of 2-(4-methoxyphenoxy)-propanoic acid.

29. A method of claim 28 wherein said sugar comprise sucrose.

30. A method of binding a topping to a base portion of a snack food item, comprising:
   (a) providing a mixture of a topping and a binder composition, the binder composition wherein said binder composition exhibits a water activity of about 0.65 to about 0.9 comprising sugar and an amount of sweetness suppressor effective to suppress any sweet taste of said binder composition, and
   (b) applying said mixture to a base portion of a snack food item.

31. A method of claim 30 wherein said binder composition comprises, by weight, about 50 to 75% of sugar, about 25 to 50% of water and an amount of sweetness suppressor effective to suppress any sweet taste of said binder.

32. A method of claim 31 wherein said binder composition further comprises about 0.1 to 1% of emulsifier.

33. A method of claim 31 wherein said sweetness suppressor comprises 2-(4-methoxyphenoxy)propanoic acid.

34. A method of claim 33 wherein said binder comprises about 0.005 to 0.5 percent, on a dry weight basis based on the weight of sugar of 2-(4-methoxyphenoxy)-propanoic acid.

35. A method of claim 33 wherein said sugar comprises sucrose.

36. A method of binding a topping to a snack food item base comprising:
   (a) providing a topped base portion comprising a base portion and a topping thereon, and
   (b) applying to said topped base portion a binder composition comprising sugar and an amount of a sweetness suppressor effective to suppress any sweet taste of said binder composition wherein said binder composition exhibits a water activity of about 0.65 to about 0.9.

37. A method of claim 36 wherein said binder composition comprises, by weight, about 50 to 75% of sugar, about 25 to 50% of water and an amount of sweetness suppressor effective to suppress any sweet taste of said binder.

38. A method of claim 37 wherein said binder composition further comprises about 0.1 to 1% of emulsifier.

39. A method of claim 37 wherein said sweetness suppressor comprises 2-(4-methoxyphenoxy)propanoic acid.

40. A method of claim 39 wherein said binder comprises about 0.005 to 0.5 percent, on a dry weight basis based on the weight of sugar, of 2-(4-methoxyphenoxy)-propanoic acid.

41. A method of claim 39 wherein said sugar comprises sucrose.

* * * * *

UNITED STATES PATENT AND TRADEMARK OFFICE
CERTIFICATE OF CORRECTION

PATENT NO. : 4,910,031

DATED : March 20, 1990

INVENTOR(S) : David L. BUDD, David L. CURTIS, O. George DOWDIE and Rajen S. MEHTA It is certified that error appears in the above-identified patent and that said Letters Patent is hereby corrected as shown below:

On the title page:

FOREIGN PATENT DOCUMENTS

"2139470 1/1984 United Kingdom ." should be
-- 2139470 11/1984 United Kingdom . --;

Column 1, line 45, "sack" should be
-- snack --;

Column 2, line 18, "Alteratively" should be
-- Alternatively --;

Column 3, line 25, "supressing" should be
-- suppressing --;

Column 4, line 5, "he" should be -- the --;

UNITED STATES PATENT AND TRADEMARK OFFICE
CERTIFICATE OF CORRECTION

PATENT NO. : 4,910,031
DATED : March 20, 1990
INVENTOR(S) : Dvaid L. BUDD, David L. CURTIS, O. George DOWDIE and Rajen S. MEHTA It is certified that error appears in the above-identified patent and that said Letters Patent is hereby corrected as shown below:

Column 4, line 37, "crackers corn" should be -- crackers, corn --;

Column 5, line 14, "i" should be -- is --;

Column 5, line 30, "temperature" should be -- temperatures --;

Claims

Claim 2, line 40, insert -- sucrose, lactose -- before -- maltodextrin --;

Claim 4, line 47, delete "comprises" and substitute therefor -- is selected from the group consisting of --;

UNITED STATES PATENT AND TRADEMARK OFFICE
CERTIFICATE OF CORRECTION

PATENT NO. : 4,910,031
DATED : March 20, 1990
INVENTOR(S) : David L. BUDD, David L. CURTIS, O. George DOWDIE and Rajen S. MEHTA It is certified that error appears in the above-identified patent and that said Letters Patent is hereby corrected as shown below:

Claim 22, line 2, insert a -- , -- after -- comprises --;

Claim 30, lines 21-23, delete "wherein said binder composition exhibits a water activity of about 0.65 to about 0.9";

Claim 30, line 26, insert -- wherein said binder composition exhibits a water activity of about 0.65 to about 0.9 -- before -- and --.

Signed and Sealed this

Fifth Day of November, 1991

Attest:

HARRY F. MANBECK, JR.

*Attesting Officer*  *Commissioner of Patents and Trademarks*